United States Patent [19]
Johnson et al.

[11] Patent Number: 5,322,348
[45] Date of Patent: Jun. 21, 1994

[54] AUTOMOTIVE SEAT ADJUSTMENT MECHANISM WITH TRAVELING SEAT BELT BUCKLE ARRANGEMENT

[75] Inventors: Richard F. Johnson, Bloomfield Hills, Mich.;

[73] Assignee: Douglas & Lomason Company, Farmington Hills, Mich.

[21] Appl. No.: 89,901

[22] Filed: Jul. 12, 1993

Related U.S. Application Data

[63] Continuation of Ser. No. 728,135, Jul. 10, 1991, abandoned.

[51] Int. Cl.⁵ ............................................. B60N 2/08
[52] U.S. Cl. ..................................... 297/473; 248/430
[58] Field of Search ............... 297/468, 470, 473, 216; 280/801, 804, 805; 248/429, 430

[56] References Cited

U.S. PATENT DOCUMENTS

| | | |
|---|---|---|
| 4,248,480 | 2/1981 | Kouckey et al. . |
| 4,262,963 | 4/1981 | Bauer et al. . |
| 4,482,188 | 11/1984 | Tilly et al. . |
| 4,526,424 | 7/1985 | Korth . |
| 4,629,254 | 12/1986 | Stolper et al. ..................... 297/473 |
| 4,669,782 | 6/1987 | Nishiyama et al. ................. 297/473 |
| 4,673,217 | 6/1987 | Nishiyama . |
| 4,676,556 | 6/1987 | Yamanoi et al. . |
| 4,720,072 | 1/1988 | Kitano .......................... 297/473 X |
| 4,726,617 | 2/1988 | Nishimura ..................... 297/473 X |
| 4,804,229 | 2/1989 | Nishino . |
| 4,818,022 | 4/1989 | Nishimura ......................... 297/473 |
| 4,824,175 | 4/1989 | Tokugawa . |
| 4,923,214 | 5/1990 | Siegrist et al. . |
| 4,940,285 | 7/1990 | Suzuki . |
| 5,031,961 | 7/1991 | Isern . |

Primary Examiner—Peter R. Brown
Attorney, Agent, or Firm—Harness, Dickey & Pierce

[57] ABSTRACT

A manually-operable automotive seat adjustment mechanism equipped with a traveling seat belt buckle anchor arrangement is disclosed. The traveling seat belt buckle anchorage arrangement is adapted to transfer vertically directed separation loads imparted on the seat belt buckle through a sliding hook-type load bracket and into the vehicle floor pan via a specially configured stationary riser. The riser is configured to maintain an interlocked relationship with respect to the sliding load bracket throughout the entire range of longitudinal fore and aft seat adjustment. In addition, the seat belt buckle anchorage arrangement includes an elongated reinforcement bracket secured to the sliding load bracket for sliding longitudinal movement therewith and which is adapted to inhibit excessive pivotable excursions of the seat belt anchor. Finally, the present structure includes a reinforced latching mechanism including primary and secondary shear plates releasably engageable with a pivotable locking arm for permitting selective fore and aft seat adjustment and which is operable for transferring shear loads to the vehicle's floor pan through the stationary riser.

9 Claims, 4 Drawing Sheets

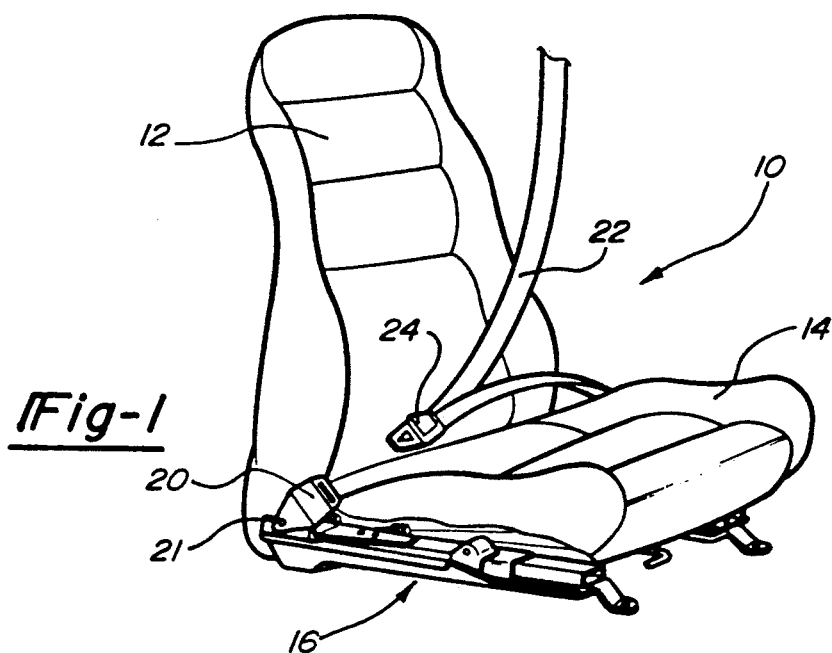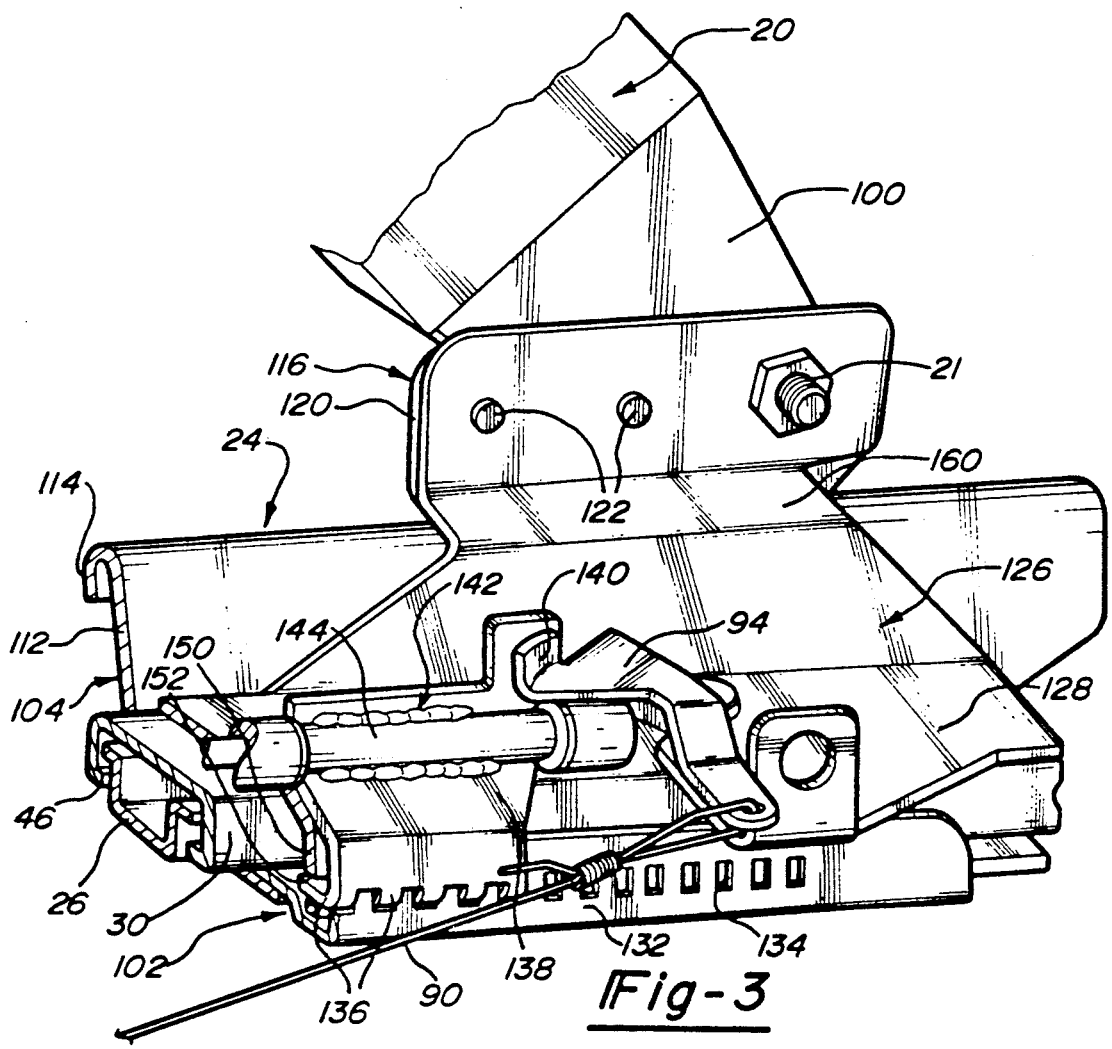

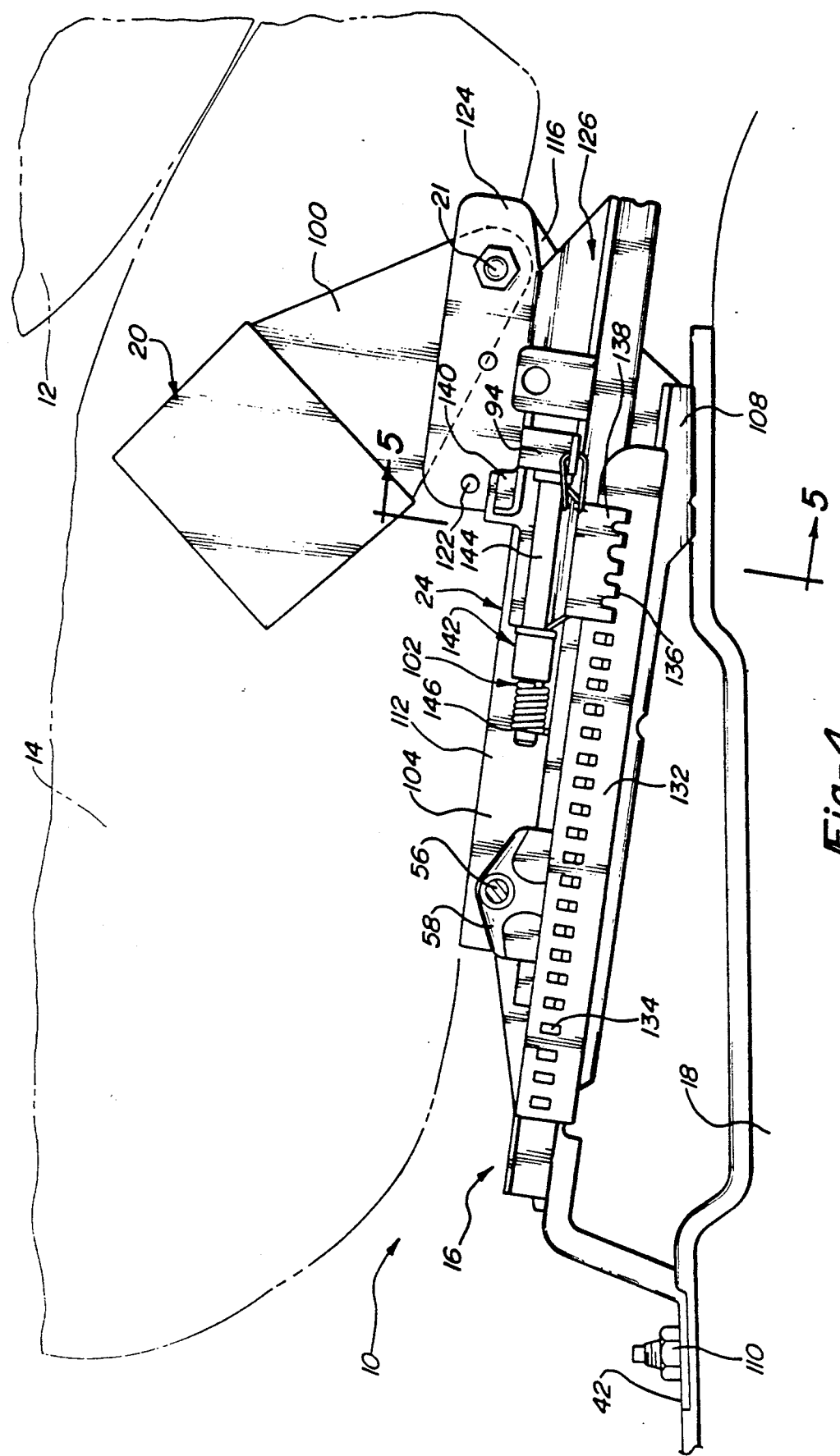

AUTOMOTIVE SEAT ADJUSTMENT MECHANISM WITH TRAVELING SEAT BELT BUCKLE ARRANGEMENT

This is a continuation of U.S. patent application Ser. No. 07/728,135, filed Jul. 10, 1991 abandoned.

BACKGROUND OF THE INVENTION

The present invention relates generally to automotive vehicle seating and, more particularly, to an automotive vehicle seat assembly equipped with a manually operable seat adjustment mechanism incorporating a traveling seat belt anchor arrangement therein.

As is known, the use of occupant impact protection or "restraint" systems is mandated for virtually all passenger-type motor vehicles. Traditionally, such restraint systems typically include a seat belt assembly for restraining the seat occupant during an emergency situation, such as during heavy braking or a vehicular collision. In many instances, the retractable seat belt and seat belt buckle are anchored directly to the floor pan of the motor vehicle along opposite lateral sides of the seat assembly. Therefore, when the seat occupant adjusts the horizontal position of the seat assembly in either of a fore or aft direction (i.e. via selectively actuating a manually operable seat adjustment mechanism) with the seat belt fastened, the seat belt tends to tighten or loosen relative to the seat occupant depending on the direction of adjustment. As a result, the seat occupant is required to re-adjust the seat belt assembly to provide the proper restraint and comfort.

In light of recent consumer demand, most automobile manufacturers have found it necessary to offer enhanced seat adjustment capabilities on even the least expensive motor vehicles. Since the cost and weight penalties associated with conventional power seat adjustment systems make their application on smaller, less expensive vehicles generally impractical, the use of a manually operable seat adjustment mechanism is largely dictated for such applications.

In order to avoid the inconveniences associated with adjustable seat systems having floor mounted seat belt buckles, it is desirable to anchor the seat belt buckle to the seat adjustment mechanism for movement with the seat assembly during fore and aft positional adjustment. However, in order to incorporate the traveling seat belt buckle into a conventional slide-type seat adjustment mechanism it is required that such systems strictly comply with stringent strength requirements to ensure adequate occupant restraint during vehicle emergency or impact conditions. During such conditions, increased loading is imposed on the seat belt buckle which is then transferred to the seat adjustment mechanism. Therefore, a seat adjustment mechanism incorporating a traveling seat belt buckle arrangement must be designed to carry and distribute sufficient anchorage loads to ensure against vertical separation (i.e. peeling) of the upper sliding track or carriage from the lower floor-mounted stationary track section. Concomitantly, the seat adjustment mechanism must inhibit forward excursions of the occupied seat assembly by securely retaining the horizontal fore/aft position of the upper sliding track with respect to the lower stationary track.

While a plethora of manually operable seat adjustment mechanisms incorporating traveling seat belt buckles have been proposed, there remains a need for continued development of a traveling buckle anchor arrangement that meets the stringent strength mandates, is relatively simple in design and construction and therefore inexpensive to manufacture, is durable, and yet is light in weight, quiet and easy to operate. Unfortunately, conventional seat adjustment mechanisms equipped with traveling seat belt anchorage arrangements have confronted the stringent load carrying mandates by incorporating extremely complicated and/or cumbersome anchorage components. Accordingly, there is a continuing need to provide an improved traveling seat belt buckle anchorage arrangement possessing the necessary structural and functional characteristics and which can be manufactured in a highly cost effective manner.

SUMMARY OF THE INVENTION

Accordingly, it is a primary object of the present invention to overcome the disadvantages associated with conventional manually-operable seat adjustment mechanisms equipped with traveling seat belt anchorage systems. In general, the present invention is directed to a manually-operable seat adjustment mechanism having an improved traveling seat belt buckle anchorage arrangement. More particularly, the traveling seat belt buckle anchorage arrangement of the present invention is adapted to transfer the vertically directed (i.e. separation) loads imparted on the seat belt buckle during a "loaded" situation (i.e. heavy braking or vehicle impact) through a sliding hook-type load bracket and into the vehicle floor pan via a specially configured structural riser. The structural riser is configured to include means for maintaining interlocked engagement with the sliding load bracket throughout the entire range of longitudinal fore and aft seat adjustment. In addition, the seat belt buckle anchorage arrangement of the present invention includes means for inhibiting excessive pivotal excursions of the buckle anchor attachment point during loaded conditions.

It is a further object of the present invention to provide a latching mechanism having primary and secondary locking means operable for permitting selective fore/aft longitudinal adjustment of the seat assembly while cooperatively increasing the resistance to forward excursions of the seat assembly during high load situations. As such, the latching mechanism is adapted to transfer horizontally directed (i.e. shear) loads imparted on the seat belt buckle during a "loaded" condition through the primary and secondary locking means and into the vehicles' floor pan via the structural riser.

According to a preferred embodiment, the manually-operable seat adjustment mechanism of the present invention includes a pair of laterally spaced stationary lower tracks defining a substantially horizontal plane and which are fixedly secured to the vehicle's floor pan. A pair of upper tracks, defining elongated carriages, are slidably coupled with the lower tracks and are operable for synchronous longitudinal movement thereon. A traveling seat belt buckle anchorage arrangement is operably associated with at least one set of the slidably interconnected lower tracks and carriages for enabling selective longitudinal movement of the carriages and, in turn, the seat along the lower tracks while inhibiting vertical and horizontal separation therebetween. More particularly, the seat belt buckle anchorage arrangement includes a structural riser adapted to be mounted to the floor pan and to which the lower stationary track is fixedly secured. The riser is configured to include a generally vertically extending portion having an elongated down-turned curl or hook formed along its upper edge and which is generally parallel to the center line of the lower track.

A sliding buckle or load bracket is configured to include a up-turned curl or hook along its lower edge that is adapted to interlock with the down-turned curl formed on the riser. The length of each curled portion is sized to maintain the interlocked engagement therebetween throughout the entire range of fore and aft sliding movement of the carriage on the lower track. Furthermore, a first end of the sliding load bracket has a planar surface that is secured to a co-planar first end portion of an elongated reinforcement bracket. Likewise, a first horizontally extending flange portion of the reinforcement bracket is directly secured to the carriage. As such, the sliding load bracket and the reinforcement bracket are slidably moveable with the carriage relative to the stationary lower track and riser. The reinforcement bracket also includes a second horizontally extending flange portion adapted to extend over the down-turned elongated curl on the riser. The second horizontal flange portion is of sufficient length to extend over the curled edge of the riser to a position well forward of the buckle anchor point for preventing the reinforcement bracket and the sliding load bracket from rotating excessively in the forward and downward directions relative to the riser during a "loaded" condition.

A primary stationary shear plate, incorporating a first series of longitudinally oriented and equally spaced apertures is attached to the riser so as to transfer horizontally directed shear loads through the riser to the vehicle floor pan. The first series of apertures are aligned to be engageable with one or more locking fingers formed on a lock arm, that is pivotably secured to the second horizontal flange portion of the reinforcement bracket, for fixing the longitudinal position of the carriage to the lower track.

In addition, a second end portion of the reinforcement bracket is configured as a vertical flange that is located between the primary stationary shear plate and the moveable carriage for defining a secondary shear plate. The secondary shear plate includes a second series of longitudinally oriented and equally spaced apertures that are alignable with the first series of apertures formed in the primary shear plate. The locking fingers on the pivotal lock arm are adapted to be concurrently received with aligned pairs of first and second apertures for providing an augmented shear resistance to fore/aft sliding movement of the seat assembly. The lock arm is pivotably supported on the reinforcement bracket such that it is possible, by use of a release handle, to selectively disengage the locking fingers from the aligned pairs of first and second apertures to permit longitudinal movement of the carriage in a fore/aft direction.

From the following written specification, taken in conjunction with the accompanying drawings and appended claims, other objects, advantages and features of the present invention will become readily apparent to one skilled in the art.

BRIEF DESCRIPTION OF THE DRAWINGS

FIG. 1 is a pictorial view of a motor vehicle seat assembly mounted to an exemplary manually-operable seat adjustment mechanism which incorporates the novel traveling seat belt buckle anchor arrangement of the present invention;

FIG. 3 is a partial perspective view of the traveling inboard seat belt anchor arrangement constructed in accordance with a preferred embodiment of the present invention;

FIG. 4 is a side elevational view, partially disassembled for purposes of clarity, of the traveling inboard seat belt anchor arrangement taken along line 4—4 of FIG. 2.

DETAILED DESCRIPTION OF THE INVENTION

Figure 2:
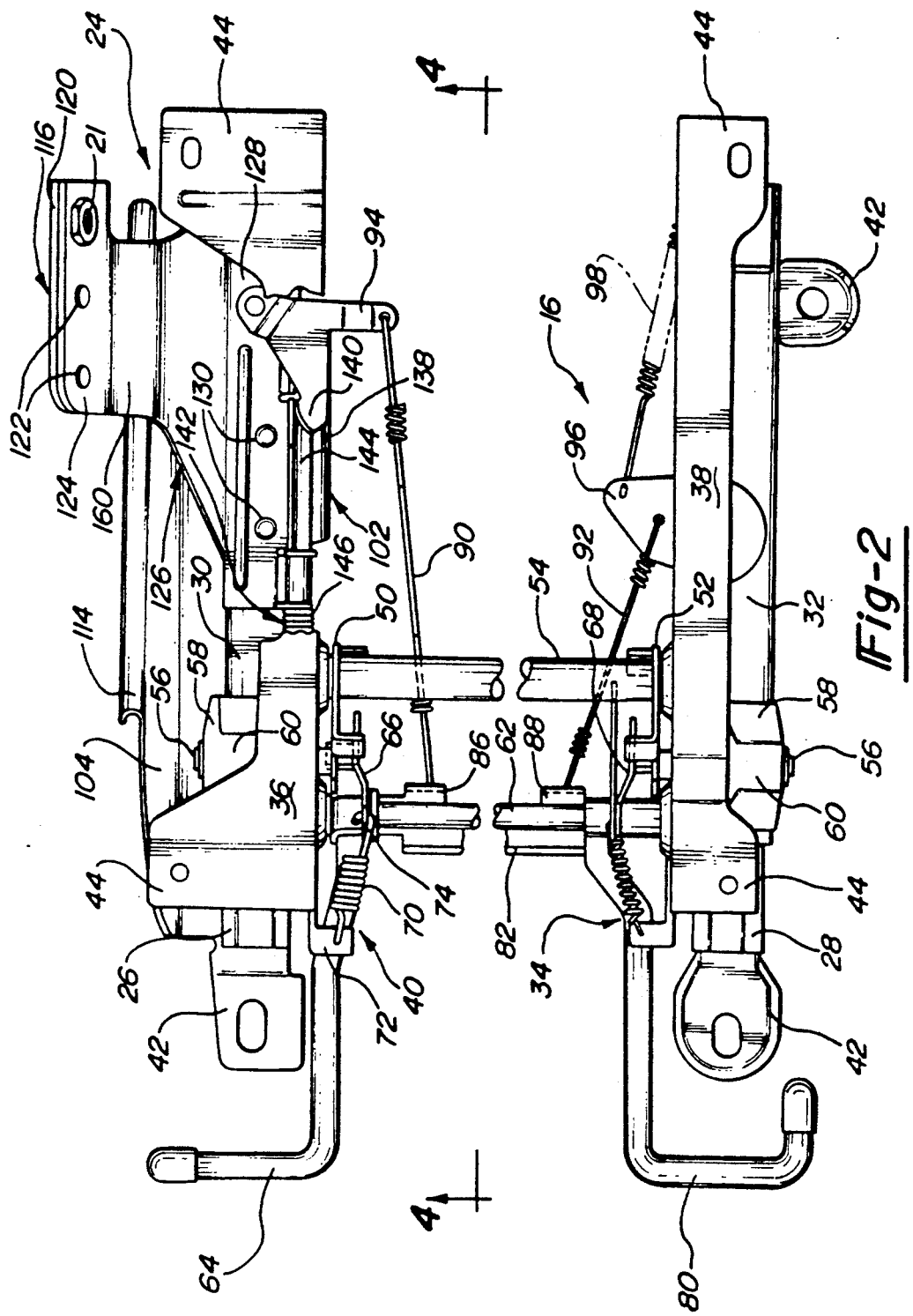
FIG. 2 is a top plan view of the manually-operable seat adjustment mechanism shown in FIG. 1 illustrating the various components associated with the traveling seat belt anchor arrangement of the present invention.

With reference to FIG. 1, an exemplary motor vehicle seat assembly 10 is shown having a seat back 12 and a seat member 14. Seat assembly 10 is shown mounted on an exemplary manually operable seat adjustment mechanism 16. As will be described hereinafter in greater detail, seat adjustment mechanism 16 is of the type providing at least fore and aft (i.e. two-way) longitudinal sliding movement of seat assembly 10 with respect to the motor vehicle's floor pan 18. A traveling seat belt buckle 20 is shown pivotal secured about an anchor point 21 to an inboard portion of seat adjustment mechanism 16 for longitudinal fore and aft movement therewith with respect to floor pan 18. A retractable shoulder and seat belt webbing combination 22 is shown having a latch 24 releasably connectable to buckle 20 for restraining a vehicle occupant within seat assembly 10. While seat assembly 10 is shown as a driver's side seat unit, it will be appreciated that the traveling seat belt buckle anchorage arrangement of the present invention, to be described hereinafter, is also readily adaptable for seat adjustment mechanisms installed on passenger-side seat units.

With particular reference now to FIG. 2, manually operable seat adjustment mechanism 16 is illustrated in greater detail. In the specific embodiment shown, seat adjustment mechanism 16 provides "four-way" adjustment that is operable for permitting manual adjustment of the vertical position of seat assembly 10 (i.e. in either of the up and down directions) and the horizontal position of seat assembly 10 (i.e., in the fore and aft directions). More particularly, the design and structure of "four-way" seat adjustment mechanism 16 is generally similar to that disclosed in U.S. Pat. No. 4,979,716, commonly owned by the assignee of the present invention, the disclosure which is expressly incorporated by reference herein. However, as will be appreciated by those skilled in the art, seat adjustment mechanism 16 is intended to be merely exemplary of the slide-type longitudinally adjustable seat systems to which the novel traveling inboard seat belt anchor arrangement, generally shown at 24, of the present invention can be readily incorporated.

With continued reference to FIG. 2, manually-operable four-way seat adjustment mechanism 16 is shown to generally include a floor-mounted base defined by a pair of laterally spaced lower stationary track members 26 and 28, upper tracks or carriages 30 and 32, a horizontal adjustment mechanism 34, seat frame members 36 and 38, a vertical adjustment mechanism 40, and traveling inboard buckle anchor mechanism 24. More particularly, track members 26 and 28 are elongated, U-shaped in cross section, and include, or are affixed to, mounting members 42 for securing tracks 26 and 28 to floor pan 18 of the motor vehicle. Carriages 30 and 32 are slidably mounted to lower rails 26 and 28, respectively, for relative movement in the horizontal fore and aft directions upon selective actuation of horizontal adjustment mechanism 34. In addition, seat frame members 36 and 38, which are bolted via front and rear mounting pads 44 to the underside substrate of seat member 14, are in turn pivotally mounted at their rearward ends to carriages 30 and 32, respectively, for providing vertical up and down movement of seat assembly 10 as will be described.

Figure 5:
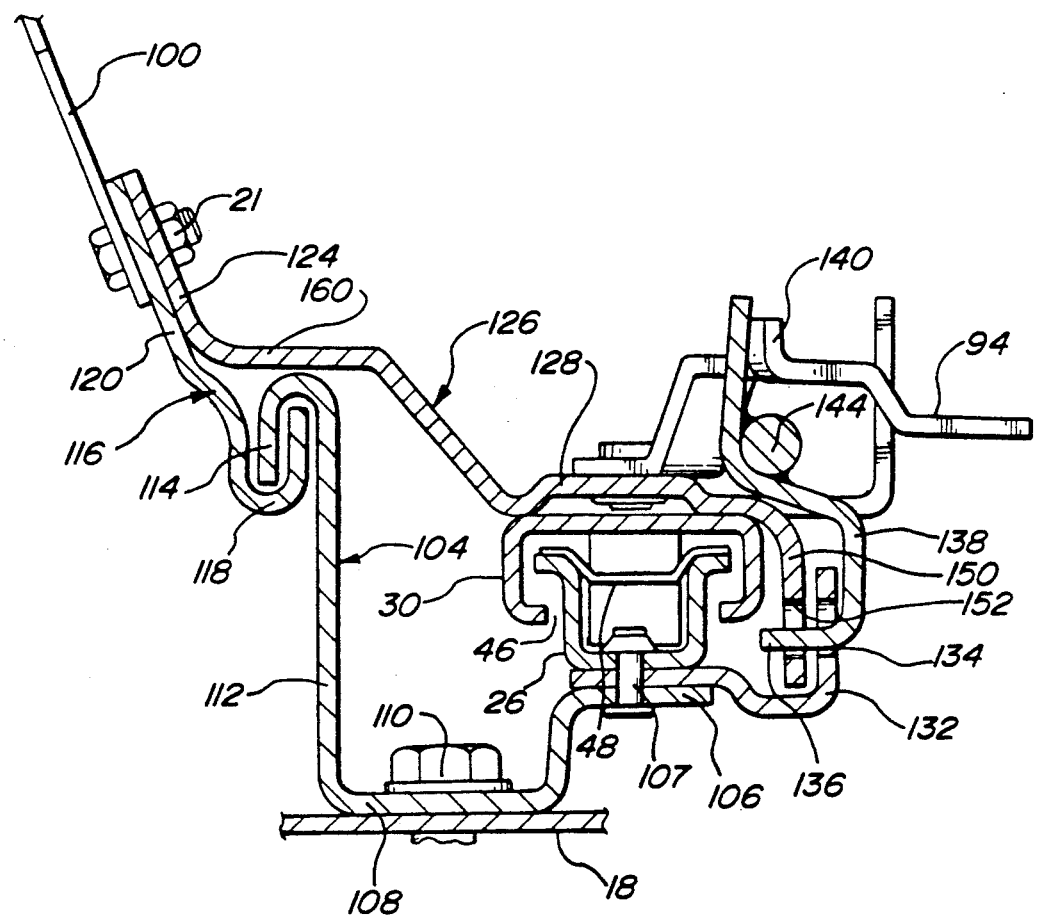
FIG. 5 is a sectional view taken along line 5—5 of FIG. 4.

Carriages 30 and 32 are elongated and have an overall rectangular shape in cross-section with a channel 46 along a lower edge thereof to enable lower tracks 26 and 28 to be slidably positioned within carriages 30 and 32, respectively, as best seen in FIGS. 3 and 5. A bearing assembly, generally shown at 48, is positioned between carriages 30 and 32 and tracks 26 and 28, respectively, to permit sliding movement of carriages 30 and 32 along tracks 26 and 28 in a substantially horizontal plane while minimizing frictional interference therebetween.

Vertical adjustment mechanism 40 is substantially similar to that described in U.S. Pat. No. 4,979,716 and includes a pair of quadrants 50 and 52 which also serve as lifting links for adjusting the front height of seat frame members 36 and 38 relative to carriages 30 and 32, respectively. Preferably, quadrants 50 and 52 are fixedly secured to opposite ends of a first torsion bar 54 that is journalled to seat frame members 36 and 38. Torsion bar 54 serves to keep the rotational position of the two quadrants 50 and 52 synchronized. In addition, quadrants 50 and 52 are, in turn, coupled to carriages 30 and 32, respectively, to support the front end portions of seat frame members 36 and 38 via support pins 56 fixedly attached to each quadrant. Support pins 56 extend into arcuate slots (not shown) formed in inner vertical flange portions of seat frame mounting members 36 and 38 and are each journalled to a mounting bracket 58. Mounting brackets 58 are supported for slidable movement along a forward portion of carriages 30 and 32. More specifically, mounting brackets 58 are configured so as to form an internal rectangular-shaped channel that is adapted to receive a forward portion of carriages 30 and 32 for accommodating relative sliding movement therebetween along their longitudinal axes. Support pins 56 are journalled through bores formed in raised portions 60 of mounting brackets 58 and are rotationally secured therein.

As shown in FIG. 2, vertical adjustment assembly 40 further includes a handle 64 fixably secured to a second torsion bar 62. Opposite ends of second torsion bar 62 are journalled for rotational movement relative to seat frame members 36 and 38. A pair of locking pawls 66 and 68 are also fixably secured to second torsion bar 62 and are adapted to pivot when handle 64 is selectively raised or lowered. Locking pawls 66 and 68 include a plurality of notch-like apertures (not shown) operable for lockingly receiving locking teeth (not shown) formed on quadrants 50 and 52 therein when handle 64 is in its lowered position. Also, a helical spring 70 exerts a biasing force against one of second torsion bar 62 or handle 64 for causing handle 64 to be normally biased toward its lower "locked" position with respect to quadrants 50 and 52. Helical spring 70 is coupled between seat frame member 36 and second torsion bar 62 by flanges 72 and 74, respectively.

When the seat occupant desires to adjust the vertical height of seat assembly 10, handle 64 is pulled in an upward direction against the biasing force of helical spring 70 such that locking pawls 66 and 68 are released from quadrants 50 and 52, respectively (i.e. simultaneously disengaging the pawl apertures from the quadrant teeth). With locking pawls 66 and 68 disengaged from locked engagement with the quadrants, the front portions of seat frame members 36 and 38 are free to move vertically, either up or down, with respect to carriages 30 and 32. More specifically, as seat frame members 36 and 38 begin to move vertically upwardly from the down position, the pivot points of quadrants 50 and 52 are likewise raised. This action causes quadrants 50 and 52 to rotate due to the fact that quadrants 50 and 52 are tied at a point radially displaced from their pivot points to mounting brackets 58 via support pins 56. It will be noted, however, that as quadrants 50 and 52 rotate in concert with the upward movement of seat frame members 36 and 38, support pins 56 are displaced initially in a forward direction with the arcuate slots, and thereafter in a rearward direction. This translational displacement of support pins 56 is accommodated by the slidable movement of mounting brackets 58 on carriages 30 and 32. Upon attaining the desired seat height position, handle 64 is released and the apertures on locking pawls 66 and 68 simultaneously re-engage the quadrant teeth to lock seat assembly 10 in position.

Horizontal adjustment mechanism 34 provides selective fore and aft slidable movement of carriages 30 and 32 on tracks 26 and 28, respectively, and includes a second handle 80 fixably secured to a crossbar 82. Crossbar 82 is rotatably secured to second torsion bar 62 and includes a pair of flanges 86 and 88 which are secured to a first end of biasing linkages 90 and 92, respectively. The opposite end of biasing linkages 90 and 92 are secured to pivotable latch levers 94 and 96, respectively. Also, a helical biasing spring 98 is secured between latch lever 96 and carriage 32 for biasing latch lever 96 and, in turn, crossbar 82 and second handle 80 toward a lower "locked" position.

In general, the latching components of horizontal adjustment mechanism 34 shown on the lower (i.e. outboard) side of seat adjustment mechanism 16 are substantially similar to that shown in U.S. Pat. No. 4,979,716. More particularly, as second handle 80 is selectively moved upwardly, latch lever 96 is pivoted until traversely projecting locking fingers (not shown) formed on latch lever 96 are disengaged from windows (not shown) formed in an inner vertical side wall of lower track 28 so as to release carriage 32 for sliding fore and aft movement. Likewise, when handle 80 is released, latch lever 96 is biased by helical biasing spring 98 for causing the locking fingers to move to a position of locked engagement with the windows formed in lower track 28. Concomitantly, biasing spring 98 assists biasing link 92 in urging second handle 80 to its lowered position. As will be described hereinafter in greater detail, the components associated with the upper (i.e. inboard) side of horizontal adjustment mechanism 34 for selectively releasing carriage 30 for sliding movement on lower track 26 have been modified in view of incorporation of improved seat belt buckle anchor arrangement 24.

With continued reference to FIGS. 2 through 5, it will be seen that the inboard portion of seat adjustment mechanism 16 has been modified to incorporate traveling inboard buckle anchor arrangement 24. In general, traveling inboard buckle anchor arrangement 24 is operatively interconnected between lower track 26 and its longitudinally moveable carriage 30 for providing means to secure an anchor portion 100 of seat belt buckle 20 for longitudinal sliding movement with carriage 30. Accordingly, the present invention is directed to a traveling inboard seat belt anchor arrangement 24 that is designed to provide sufficient load carrying capacity to insure against separation (i.e., peeling) of carriage 30 from lower track 26 during a "loaded" condition (i.e. heavy braking or vehicular collision). As such, the present invention is configured to transfer both horizontally directed forces (i.e. shear) and vertically directed forces to the vehicle's floor pan 18. Furthermore, traveling buckle anchor arrangement 24 is operably associated with horizontal adjustment mechanism 34 to provide a reinforced latching system 102 including primary and secondary locking means for securely retaining the fore/aft relationship of carriage 30 and, in turn, seat assembly 10 relative to lower track 26. Finally, traveling inboard buckle anchor arrangement 24 also includes means for limiting the vertical and horizontal excursions of buckle attachment point 21 during "loaded" conditions.

In view of the superior load distribution characteristics of the present invention, reinforced latching system 102, shown associated with pivotal latch lever 94, is preferably only required on the side of seat assembly 10 which carries seat belt buckle 20 on buckle anchor 100. However, as will be appreciated by those skilled in the art, reinforced latching mechanism 102 of the present invention can likewise be incorporated into the opposite side of seat adjustment mechanism 16 if required for a prescribed vehicular seating application.

With particular reference now to FIGS. 3 through 5, traveling seat belt buckle anchor arrangement 24 is shown to include a structurally rigid bracket or riser 104 having an elongated, generally horizontally extending planar flange 106 upon which lower track 26 is securely mounted such as by rivets 107. As shown, riser 104 is secured to a front mounting pad 42 and is configured to form a rear mounting pad 108 such that mounting pads 42 and 108 are adapted for direct attachment to floor pan 18 such as by fasteners 110. Riser 104 has a generally vertically extending wall portion 112 that terminates in a down-turned hook or curled lip 114 which extends substantially along the entire length of riser 104. Preferably, curled lip 114 and vertical wall portion 112 are substantially parallel to the longitudinal axis of lower track 26. While the open side of hook-shaped curl 114 may be formed either inwardly (i.e. toward seat track 26) or outwardly (i.e. away from seat track 26) it is shown preferably formed to extend away therefrom.

As best seen in FIG. 5, a sliding load or buckle bracket 116 configured as a generally J-shaped rigid member includes an up-turned hook or curled lip 118 that is adapted to be slidably interlocked with hook-shaped curled lip 114 formed on riser 104. During normal operation of seat adjustment mechanism 16, hook-shaped curled lips 114 and 118 are not in actual contacting engagement so as to inhibit frictional interference upon sliding movement therebetween.

Buckle bracket 116 also includes a planar portion 120 that is fixedly secured, such as by rivets 122, to a co-planar surface of a first end portion 124 of a sliding reinforcement bracket 126. Further, a generally horizontally extending first flange portion 128 of reinforcement bracket 126 is secured to carriage 30 via rivets 130. As such, buckle bracket 116 and reinforcement bracket 126 are slidably moveable with carriage 30 with respect to stationary riser 104 and lower track 26. In addition, the up-turned curled lip 118 of J-shaped buckle bracket 116 is so arranged as to be maintained in continuous sliding interlocked engagement with hook-shaped curled lip 114 of riser 104 throughout the entire range of fore and aft longitudinal travel of carriage 30 with respect to lower track 26.

Reinforced latching system 102 associated with buckle anchor arrangement 24 includes an elongated primary shear plate 132 that is fixedly secured along substantially the entire length of lower track 26 and having a first series of longitudinally oriented and equally spaced apertures 134. It is contemplated that primary shear plate 132 may be integrally formed with, or directly mounted to horizontally extending planar flange 106 of riser 104. Furthermore, the first series of apertures 134 formed in primary shear plate 132 are configured to permit selective engagement and disengagement of a plurality of locking fingers 136, formed on a pivotally moveable locking arm 138, with apertures 134. A striker 140 formed on latch lever 94 acts upon locking arm 138 when second handle 80 is selectively raised for causing locking arm 138 to pivot about hinge assembly 142 for disengaging locking fingers 136 from the first series of apertures 134. Hinge assembly 142 is mounted to first flange portion 128 of reinforcement bracket 126 and includes a hinge pin 144 that is fixedly connected to locking arm 138. A hinge spring 146 concentrically surround one end of hinge pin 144 for normally biasing hinge pin 144 and, in turn, locking arm 138 toward a "locked" position wherein locking fingers 136 are lockingly received in first apertures 134 of primary shear plate 132. In addition, the use of a plurality of locking finger 136 formed on the relatively elongated locking arm 138 is effective in distributing the horizontally directed shear loading applied thereto. In addition, hinge spring 146 exerts a sufficient biasing force on locking arm 138 to assist in biasing second handle 80 toward its lower "locked" position.

As noted, first horizontal flange portion 128 of reinforcement bracket 126 extends over carriage 30 and is fixedly secured thereto for longitudinal motion therewith. More specifically, first horizontal flange portion 128 extends over an upper portion of carriage 30 and is adapted to support locking arm 138, hinge assembly 142, and pivotable latch lever 94 thereon. In addition, a second end portion of reinforcement bracket 126 defines a vertically extending elongated flange 150 that is located intermediate an inside edge of carriage 30 and primary shear plate 132. The vertically extending elongated flange 150 defines a secondary shear plate on which a second series of longitudinally oriented and equally spaced apertures 152 are formed. Since reinforcement bracket 126 moves with carriage 30, the first and second series of apertures 134 and 152, respectively, are alignable for receipt of locking fingers 136 therein for locking carriage 30 and, in turn, seat assembly 10 in a desired longitudinal fore and aft location.

In operation, as second handle 80 is selectively moved upwardly, latch lever 94 is caused to pivot such that striker 140 acts on locking arm 138. As such, locking fingers 136 are pivotably moved out of engagement with the aligned pairs of first and second apertures 134 and 152, respectively. As will be appreciated, such action occurs substantially simultaneously with the release of the transversely projecting teeth on latch lever 96 from the windows formed in lower track 28 for synchronously releasing both carriages 30 and 32 for adjustable movement of seat assembly 10 in either the fore and aft direction. Likewise, when second handle 80 is released, hinge spring 146 causes locking arm 138 to pivot in an opposite direction for causing locking fingers 136 to enter the aligned pairs of apertures 134 and 152, respectively, extending through primary and secondary shear plates 132 and 150, respectively. Simultaneously, the locking teeth on latch lever 96 engage the windows formed in lower track 28.

Preferably, primary shear plate 132 and secondary shear plate 150 are oriented in relatively close proximity to the other for augmenting the resistance of reinforced latching system 102 to shear loading. Functionally, the horizontally directed shear loads are transferred from primary shear plate 132 to riser 104 and, in turn, to floor pan 18.

To provide means for limiting the pivotal excursion of buckle anchor point 21, reinforcement bracket 126 further includes generally horizontally extending second flange portion 160 which is of sufficient length to extend over hook-shaped curled lip 114 of riser 104 to a position well forward of the belt anchor point 21. As such, second flange portion 160 augments the resistance to "peeling" of carriage 30 from lower track 26 upon vertically directing separation loads being imparted on buckle 20 by maintaining interlocked engagement of curled lip 114 of riser 104 and curled lip 118 on J-shaped buckle bracket 116. More particularly, forward pivotal loading about attachment point 21 tends to cause a forward end portion of second flange 160 on reinforcement bracket 126 to engage curled lip 114 on riser 104 so as to further inhibit separation between the interlocked curled lips 114 and 118.

The foregoing discussion is merely intended to disclose and describe an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A seat adjustment mechanism for a vehicle seat comprising:

a seat track assembly defining a longitudinal axis and comprising a base member adapted to be secured to the floor of the vehicle, a carriage member slidably engaged with said base member in the fore and aft directions along said longitudinal axis of said seat track assembly, and manually operable adjustment means for selectively permitting longitudinal movement of said carriage member relative to said base member;

a stationary riser having a substantially vertical wall portion with the upper part of said wall portion defining a longitudinal channel that runs parallel to the axis of said seat track assembly for a distance at least as great as the distance of fore and aft adjustment of said carriage member relative to said base member;

a slide bracket having a lower portion interlockingly interfitted with said longitudinal channel and an upper portion defining a seat belt anchor point; and a reinforcement member having a first end portion rigidly secured to said upper portion of said slide bracket, a substantially horizontally oriented intermediate portion extending in intimate proximity over the top of said upper part of said stationary riser for a distance along said longitudinal channel from the vicinity of said anchor point to a position well forward of said anchor point, and a second end rigidly secured to said carriage such that said slide bracket and said reinforcement member are longitudinally moveable with said carriage along said channel and said base member, respectively;

wherein said manually operable adjustment means includes:

a pivotable lock arm supported for longitudinal movement with said carriage, said lock arm pivotably moveable between a first locked position and a second released position;

a primary shear plate rigidly secured to a portion of said riser laterally displaced relative to said longitudinal channel, said primary shear plate having first locking means engageable with said lock arm for inhibiting longitudinal movement of said carriage when said lock arm is in said first position;

a secondary shear plate integrally formed on said second end of said reinforcement member and having second locking means engageable with said lock arm and adapted to cooperate with said first locking means for assisting in inhibiting longitudinal movement of said carriage when said lock arm is in said first position; and biasing means for biasing said lock arm toward said first position, said manually operable adjustment means adapted to transfer horizontally directed loads imparted on said seat belt anchor to the floor of the vehicle through said primary and secondary shear plates and said riser member.

2. The seat adjustment mechanism of claim 1 wherein said first defines a series of longitudinally extending apertures formed on said primary shear plate, said second locking means defining a second series of longitudinally extending apertures formed on said secondary shear plate, and wherein said lock arm includes a plurality of locking fingers, whereby receipt of said locking fingers within aligned pairs of said first and second apertures when said lock arm is in said first position is operable for transmitting said horizontally directed shear loads from said primary and secondary shear plates to said riser.

3. The seat adjustment mechanism of claim 2 wherein said manually-operable adjustment means further includes a handle operable for pivotably moving said lock arm to said second released position against the biasing of said biasing means for disengaging said locking fingers from said aligned pairs of first and second apertures, whereby a vehicle operator is able to selectively adjust fore and aft the position of the vehicle seat.

4. The seat adjustment mechanism of claim 3 wherein said secondary shear plate is a generally vertically extending flange that is located intermediate said seat track assembly and said primary shear plate.

5. The seat adjustment mechanism of claim 1 wherein said riser further includes an elongated generally horizontal flange portion to which said primary shear plate and said seat track assembly are rigidly secured.

6. A vehicle seat comprising: a seat bottom including a seat frame coupled to a manually operable seat adjustment mechanism, said seat adjustment mechanism including:

a seat track assembly defining a longitudinal axis and comprising a base member adapted to be secured to the floor of the vehicle, a carriage member slidably engaged with said base member in the fore and aft directions along said longitudinal axis of said seat track assembly, and manually operable adjustment means for selectively permitting longitudinal movement of said carriage member relative to said base member;

a stationary riser having a substantially vertical wall portion with the upper part of said wall portion defining a longitudinal channel that runs parallel to the axis of said seat track assembly for a distance at least as great as the distance of fore and aft adjustment of said carriage member relative to said base member;

a slide bracket having a lower portion interlockingly interfitted with said longitudinal channel and an upper portion defining a seat belt anchor point; and a reinforcement member having a first end portion rigidly secured to said upper portion of said slide bracket, a substantially horizontally oriented intermediate portion extending in intimate proximity over the top of said upper part of said stationary riser for a distance along said longitudinal channel from the vicinity of said anchor point to a position well forward of said anchor point, and a second end rigidly secured to said carriage such that said slide bracket and said reinforcement member are longitudinally moveable with said carriage along said channel and said base member, respectively;

wherein said manually operable adjustment means includes:

a pivotable lock arm supported for longitudinal movement with said carriage, said lock arm pivotably moveable between a first locked position and a second released position;

a primary shear plate rigidly secured to a portion of said riser laterally displaced relative to said longitudinal channel, said primary shear plate having first locking means engageable with said lock arm for inhibiting longitudinal movement of said carriage when said lock arm is in said first position;

a secondary shear plate integrally formed on said second end of said reinforcement member and having second locking means engageable with said lock arm and adapted to cooperate with said first locking means for assisting in inhibiting longitudinal movement of said carriage when said lock arm is in said first position; and biasing means for biasing said lock arm toward said first position, said manually operable adjustment means adapted to transfer horizontally directed loads imparted on said seat belt anchor to the floor of the vehicle through said primary and secondary shear plates and said riser member.

7. The vehicle seat of claim 6 wherein said first locking means defines a series of longitudinally extending apertures formed on said primary shear plate, said second locking means defining a second series of longitudinally extending apertures formed on said secondary shear plate, and wherein said lock arm includes a plurality of locking fingers, whereby receipt of said locking fingers within aligned pairs of said first and second apertures when said lock arm is in said first position is operable for transmitting said horizontally directed shear loads from said primary and secondary shear plates to said riser.

8. The vehicle seat of claim 7 wherein said manually-operable adjustment means further includes a handle operable for pivotably moving said lock arm toward said second released position against the biasing of said biasing means for disengaging said locking fingers from said aligned pairs of first and second apertures for permitting a vehicle operator to selectively adjust the fore and apt position of the vehicle seat.

9. The vehicle seat of claim 6 wherein said seat adjustment mechanism includes a second seat track assembly defining a second longitudinal axis parallel to the longitudinal axis of the other seat track assembly and comprising a second base member adapted to be secured to the floor of the vehicle, a second carriage member slidably engaged with said second base member, and second manually operable adjustment means for selectively permitting longitudinal movement of said second carriage member relative to said second base member synchronously with the longitudinal movement of the other carriage member.

* * * * *